US009993764B2

(12) United States Patent
Campbell

(10) Patent No.: US 9,993,764 B2
(45) Date of Patent: *Jun. 12, 2018

(54) FILTER FOR A PROPELLANT GAS EVACUATION SYSTEM

(71) Applicant: Justrite Manufacturing Company, LLC, Des Plaines, IL (US)

(72) Inventor: Michael C. Campbell, Virginia Beach, VA (US)

(73) Assignee: Justrite Manufacturing Company, LLC, Des Plaines, IL (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/676,458

(22) Filed: Apr. 1, 2015

(65) Prior Publication Data
US 2015/0273384 A1    Oct. 1, 2015

Related U.S. Application Data

(60) Provisional application No. 62/063,885, filed on Oct. 14, 2014, provisional application No. 61/973,374, filed on Apr. 1, 2014.

(51) Int. Cl.
*B01D 53/02* (2006.01)
*B01D 53/04* (2006.01)
(Continued)

(52) U.S. Cl.
CPC ..... *B01D 53/0407* (2013.01); *B01D 46/0005* (2013.01); *B01D 46/0019* (2013.01);
(Continued)

(58) Field of Classification Search
CPC ........ B01D 2253/102; B01D 2257/702; B01D 46/0005; B01D 46/0019; B01D 46/0093; B01D 46/4254; B01D 53/0407
See application file for complete search history.

(56) References Cited

U.S. PATENT DOCUMENTS 1,242,873 A    10/1917    Schroeder
1,555,759 A    9/1925    Rowe
(Continued)

FOREIGN PATENT DOCUMENTS

CN    105312302 A    2/2016
DE    1607991 A1    10/1970
(Continued)

OTHER PUBLICATIONS

U.S. Appl. No. 15/149,136, filed Dec. 3, 2015, Michael C. Campbell.
(Continued)

*Primary Examiner* — Christopher P Jones
(74) *Attorney, Agent, or Firm* — Leydig, Voit & Mayer, Ltd.

(57) ABSTRACT

A filter assembly with upper and lower filter chambers containing activated carbon and a coalescing filter, respectively. The filter assembly includes a visual indicator for showing when the filter assembly is saturated and requires replacement or maintenance. In a preferred embodiment, the visual indicator is a temperature indicator. In an alternate embodiment, the visual indicator is an air flow indicator. The filter assembly further includes at least one flashback inhibitor to prevent igniting fumes. The filter assembly connected to a storage drum which accepts residue from pressurized containers and removes contaminants from gas fumes which escape from the storage drum.

18 Claims, 5 Drawing Sheets

(51) Int. Cl.
  *B01D 46/00* (2006.01)
  *B01D 46/42* (2006.01)
(52) U.S. Cl.
  CPC ..... *B01D 46/0093* (2013.01); *B01D 46/4254* (2013.01); *B01D 2253/102* (2013.01); *B01D 2257/702* (2013.01)

(56) References Cited

U.S. PATENT DOCUMENTS

| | | |
|---|---|---|
| 1,586,298 A | 5/1926 | Eaton |
| 1,599,685 A | 9/1926 | Spaeth |
| 1,718,985 A | 7/1929 | Scoville |
| 2,014,187 A | 9/1935 | Neff |
| 2,553,942 A | 5/1951 | Roos |
| 2,569,319 A | 9/1951 | Krug |
| 2,778,223 A | 11/1953 | Kimbrell |
| 2,671,528 A | 3/1954 | Gross |
| 2,851,768 A | 9/1958 | Ellis |
| D185,589 S | 6/1959 | Allen |
| 3,157,107 A | 11/1964 | Kosar |
| 3,169,665 A | 2/1965 | Colley |
| 3,303,968 A | 2/1967 | Compere |
| 3,333,735 A | 8/1967 | Odasso |
| 3,358,883 A | 12/1967 | Loe |
| 3,430,819 A | 3/1969 | Moonan |
| 3,438,548 A | 4/1969 | Ceyba |
| 3,828,976 A | 8/1974 | Sidelinker |
| 3,834,589 A | 9/1974 | Morane et al. |
| 3,840,967 A | 10/1974 | Olson |
| 3,891,417 A * | 6/1975 | Wade .......... B01D 46/003 55/487 |
| 3,926,340 A | 12/1975 | Tygenhof |
| 4,071,012 A | 1/1978 | Cooke |
| 4,223,799 A | 9/1980 | Eyster et al. |
| 4,252,547 A | 2/1981 | Johnson |
| D266,188 S | 9/1982 | Seeley et al. |
| 4,349,054 A | 9/1982 | Chipman et al. |
| 4,407,341 A | 10/1983 | Feldt et al. |
| 4,420,012 A | 12/1983 | Astrom |
| 4,426,863 A | 1/1984 | Gillette et al. |
| 4,459,906 A | 7/1984 | Cound et al. |
| 4,500,015 A | 2/1985 | Penney |
| 4,580,700 A | 4/1986 | Rush |
| 4,620,576 A | 11/1986 | Owen, Jr. |
| 4,655,060 A | 4/1987 | Jakubas |
| 4,699,190 A | 10/1987 | Bates |
| 4,700,866 A | 10/1987 | Taylor |
| 4,705,082 A | 11/1987 | Fanshaw et al. |
| 4,742,688 A | 5/1988 | Rubin |
| 4,782,597 A | 11/1988 | Mills |
| 4,788,840 A | 12/1988 | Wilson, Jr. |
| 4,811,977 A | 3/1989 | Swift et al. |
| 4,834,267 A | 5/1989 | Schroer et al. |
| 4,934,055 A | 6/1990 | Chambers |
| 4,959,980 A | 10/1990 | Phillips |
| 4,968,333 A | 11/1990 | Ellis et al. |
| 5,002,593 A | 3/1991 | Ichishita et al. |
| 5,067,529 A | 11/1991 | Gonzalez-Miller et al. |
| 5,086,814 A | 2/1992 | Sato et al. |
| 5,088,526 A | 2/1992 | Nash |
| 5,114,043 A | 5/1992 | Collins, Jr. |
| 5,125,700 A | 6/1992 | Fattori et al. |
| 5,141,656 A | 8/1992 | Rountree |
| 5,163,585 A | 11/1992 | Campbell |
| 5,181,462 A | 1/1993 | Isaac |
| 5,188,155 A | 2/1993 | Kremer |
| 5,199,286 A | 4/1993 | Jakubas |
| 5,265,762 A | 11/1993 | Campbell |
| 5,271,437 A | 12/1993 | O'Brien |
| 5,284,997 A | 2/1994 | Spearman |
| 5,285,827 A | 2/1994 | Gonzalez-Miller et al. |
| 5,303,749 A | 4/1994 | Stock et al. |
| 5,309,956 A | 5/1994 | Hajma |
| 5,322,093 A | 6/1994 | O'Neil |
| 5,332,009 A | 7/1994 | VanEtten |
| 5,337,503 A | 8/1994 | Goby |
| 5,339,876 A | 8/1994 | Mattern |
| 5,341,853 A | 8/1994 | Nugues et al. |
| 5,351,859 A | 10/1994 | Jansen |
| 5,365,982 A | 11/1994 | O'Neill |
| 5,370,268 A | 12/1994 | Adams |
| 5,383,498 A | 1/1995 | Mattern et al. |
| 5,385,177 A | 1/1995 | O'Neil |
| 5,421,380 A | 6/1995 | Campbell |
| 5,427,157 A | 6/1995 | Nickens |
| 5,427,609 A | 6/1995 | Zoglman et al. |
| 5,460,154 A | 10/1995 | Mattern et al. |
| 5,465,473 A | 11/1995 | Teeslink |
| 5,469,898 A | 11/1995 | Campbell |
| 5,471,730 A | 12/1995 | Sackett |
| 5,474,114 A | 12/1995 | Nickens et al. |
| 5,499,665 A | 3/1996 | Gold et al. |
| 5,499,945 A | 3/1996 | Ferlin et al. |
| 5,524,945 A | 6/1996 | Georgopoulos et al. |
| 5,529,097 A | 6/1996 | Campbell |
| 5,533,767 A | 7/1996 | Georgopoulos et al. |
| 5,535,730 A | 7/1996 | Mattern |
| 5,546,995 A | 8/1996 | Van Etten |
| 5,564,414 A | 10/1996 | Walker et al. |
| 5,568,951 A | 10/1996 | Morgan |
| 5,584,325 A | 12/1996 | Nickens et al. |
| 5,596,892 A | 1/1997 | Edgar et al. |
| 5,613,533 A | 3/1997 | Gold et al. |
| 5,613,534 A | 3/1997 | Nickens et al. |
| 5,615,715 A | 4/1997 | Yore |
| 5,657,800 A | 8/1997 | Campbell |
| D383,659 S | 9/1997 | Norman |
| 5,664,610 A | 9/1997 | Nickens et al. |
| 5,702,592 A | 12/1997 | Suri et al. |
| 5,715,803 A | 2/1998 | Mattern |
| 5,727,498 A | 3/1998 | Hackler et al. |
| 5,740,615 A | 4/1998 | Treske |
| 5,743,246 A | 4/1998 | Mattern |
| 5,775,362 A | 7/1998 | Sato et al. |
| 5,785,038 A | 7/1998 | Mattern |
| 5,819,815 A | 10/1998 | Nickens et al. |
| 5,823,236 A | 10/1998 | Kirby et al. |
| 5,826,447 A | 10/1998 | Campbell |
| 5,826,631 A | 10/1998 | Gold et al. |
| 5,832,966 A | 11/1998 | Nickens et al. |
| 5,868,174 A | 2/1999 | Mattern |
| 5,900,216 A | 5/1999 | Nickens et al. |
| 5,901,759 A | 5/1999 | Nickens et al. |
| 5,918,649 A | 7/1999 | Johse |
| 5,934,511 A | 8/1999 | Ausmus |
| 5,957,168 A | 9/1999 | Nickens et al. |
| 5,967,012 A | 10/1999 | Dummer et al. |
| 5,979,709 A | 11/1999 | Liccioni |
| 5,992,475 A | 11/1999 | Campbell |
| 6,000,391 A | 12/1999 | Timmons |
| 6,013,121 A | 1/2000 | Chiu et al. |
| 6,041,506 A | 3/2000 | Iwao |
| 6,053,362 A | 4/2000 | Lin |
| 6,139,806 A | 10/2000 | Nickens et al. |
| 6,164,344 A | 12/2000 | Nickens et al. |
| 6,219,925 B1 | 4/2001 | Chen |
| 6,240,981 B1 | 6/2001 | Nickens et al. |
| D446,816 S | 8/2001 | Hsuan |
| 6,308,748 B1 | 10/2001 | Nickens et al. |
| 6,318,252 B1 | 11/2001 | Kao |
| 6,331,141 B1 | 12/2001 | Chua |
| 6,393,900 B1 | 5/2002 | Buckner, III et al. |
| D458,308 S | 6/2002 | Hsuan |
| 6,412,384 B1 | 7/2002 | Lwao |
| 6,422,273 B1 | 7/2002 | Campbell |
| 6,428,410 B1 | 8/2002 | Campbell |
| 6,450,192 B1 | 9/2002 | Romanek |
| 6,481,470 B1 | 11/2002 | Rubenic |
| 6,644,515 B1 | 11/2003 | Campbell |
| 6,709,221 B2 | 3/2004 | Roura Adell et al. |
| 6,743,281 B1 | 6/2004 | Miller |
| 6,810,731 B1 | 11/2004 | Lo |
| 6,908,372 B2 | 6/2005 | Larsson |

(56) References Cited

U.S. PATENT DOCUMENTS

| | | | |
|---|---|---|---|
| 6,923,851 B1 * | 8/2005 | Butler | B01D 46/0023 55/324 |
| 6,941,979 B1 | 9/2005 | Potts et al. | |
| 7,562,622 B2 | 7/2009 | Babiel et al. | |
| 7,690,130 B1 | 4/2010 | Risinger | |
| D632,318 S | 2/2011 | Sindlinger | |
| 7,930,947 B2 | 4/2011 | Counts | |
| 7,946,010 B1 | 5/2011 | Myers et al. | |
| D671,357 S | 11/2012 | Trombly | |
| D675,237 S | 1/2013 | Broadbent et al. | |
| D685,035 S | 6/2013 | Kanbar | |
| D690,332 S | 9/2013 | Morehead et al. | |
| 8,997,617 B2 | 4/2015 | Thomson | |
| D737,904 S | 9/2015 | Kuehne | |
| 9,314,661 B1 | 4/2016 | Chen | |
| D761,673 S | 7/2016 | Allen et al. | |
| 2002/0170861 A1 | 11/2002 | Monsrud et al. | |
| 2003/0027699 A1 | 2/2003 | Brodie et al. | |
| 2003/0189002 A1 | 10/2003 | Proulx et al. | |
| 2004/0038096 A1 * | 2/2004 | Chou | C25B 15/02 429/413 |
| 2004/0045424 A1 | 3/2004 | Ikeda et al. | |
| 2006/0191422 A1 | 8/2006 | Dorion | |
| 2007/0005072 A1 | 1/2007 | Castillo et al. | |
| 2007/0068352 A1 | 3/2007 | Morgan | |
| 2007/0180723 A1 | 8/2007 | Morgan | |
| 2008/0173086 A1 | 7/2008 | McQuaid | |
| 2008/0295562 A1 | 12/2008 | Straka | |
| 2008/0314220 A1 | 12/2008 | Ferry et al. | |
| 2009/0050121 A1 | 2/2009 | Holzmann et al. | |
| 2009/0223032 A1 | 9/2009 | Huang et al. | |
| 2010/0095815 A1 | 4/2010 | Laib et al. | |
| 2011/0016733 A1 | 1/2011 | Peretti | |
| 2011/0265655 A1 | 11/2011 | Schuster et al. | |
| 2012/0024771 A1 | 2/2012 | Abdalla et al. | |
| 2012/0094810 A1 | 4/2012 | Anderson | |
| 2012/0121751 A1 | 5/2012 | Atagi et al. | |
| 2012/0210689 A1 | 8/2012 | Rogers et al. | |
| 2013/0042944 A1 | 2/2013 | Campbell | |
| 2013/0109545 A1 | 5/2013 | Chen | |
| 2013/0209338 A1 * | 8/2013 | Prasad | B01D 53/75 423/219 |
| 2014/0018213 A1 | 1/2014 | Chen | |
| 2014/0109742 A1 | 4/2014 | Elsmore et al. | |
| 2014/0121075 A1 | 5/2014 | Brown | |
| 2014/0162850 A1 | 6/2014 | Chen | |
| 2014/0202375 A1 | 7/2014 | Goff | |
| 2015/0273384 A1 | 10/2015 | Campbell | |
| 2015/0298955 A1 | 10/2015 | Campbell | |
| 2016/0325222 A1 | 11/2016 | Campbell | |
| 2016/0338712 A1 | 11/2016 | Chernosky et al. | |

FOREIGN PATENT DOCUMENTS

| | | |
|---|---|---|
| DE | 4204836 C2 | 8/1993 |
| DE | 19932519 A1 | 5/2001 |
| EP | 417022 A1 | 3/1991 |
| EP | 550815 A1 | 7/1993 |
| FR | 616328 A | 1/1927 |
| SU | 821399 A1 | 4/1981 |
| WO | WO 92/18418 A1 | 10/1992 |
| WO | WO 96/22916 A1 | 8/1996 |
| WO | WO 97/48475 | 12/1997 |
| WO | WO 00/05137 | 2/2000 |
| WO | WO 2009/156757 A1 | 12/2009 |
| WO | WO 2016/182976 A1 | 11/2016 |
| WO | WO 2017/030540 A1 | 2/2017 |
| WO | WO 2017/058229 A1 | 4/2017 |

OTHER PUBLICATIONS

U.S. Appl. No. 29/547,478, filed Dec. 3, 2015, Michael C. Campbell.
U.S. Appl. No. 29/546,867, filed Nov. 25, 2015, Michael C. Campbell.
U.S. Appl. No. 61/940,810, filed Feb. 17, 2014, Michael C. Campbell.
U.S. Appl. No. 61/973,374. filed Apr. 1, 2014, Michael C. Campbell.
U.S. Appl. No. 62/063,885, filed Oct. 14, 2014, Michael C. Campbell.
U.S. Appl. No. 62/158,928, filed May 8, 2015, Michael C. Campbell.
Aerosol Can Disposal—American Gas Products, Inc.
TalkTools "Adult Straw with Blue Lip Block," http://www.talktools.com/adult-straw-with-blue-lip-block/ 1 page (Oct. 7, 2016).
U.S. Patent and Trademark Office, International Search Report in International Application No. PCT/US1999/016418 (dated Nov. 4, 1999).
U.S. Patent and Trademark Office, International Search Report in International Application No. PCT/US2015/045366 (dated Nov. 24, 2015).
U.S. Patent and Trademark Office, International Search Report in International Application No. PCT/US2015/053416 (dated Dec. 30, 2015).
U.S. Patent and Trademark Office, International Search Report in International Application No. PCT/US2016/031396 (dated Aug. 11, 2016).

* cited by examiner

FILTER FOR A PROPELLANT GAS EVACUATION SYSTEM

CROSS REFERENCE TO RELATED APPLICATION

This application claims the benefit of U.S. Provisional Application No. 62/063,885, filed Oct. 14, 2014 for "Puncturing device for aerosol containers and improved filter", and U.S. Provisional Application No. 61/973,374, filed Apr. 1, 2014 for "Improved filter for a propellant gas evacuation system", both incorporated by reference herein in their entirety.

BACKGROUND OF THE INVENTION

1. Field of the Invention

This invention relates generally to gaseous-material evacuation systems and more particularly to such systems having filters for cleaning evacuated gases.

2. Description of Related Art

This invention has uses in the area of waste disposal, such as in devices and systems for evacuating aerosol cans, and other containers of pressurized gases and residue contents.

Pressurized aerosol cans, and other pressurized containers, have widespread usage in homes and industry. It has long been recognized that improper disposal of such containers constitutes a safety hazard in that excessive external heat and/or pressure can cause them to explode if they have not been relieved of internal pressure. Similarly, the release of contents, both propellant gases and dangerous residue materials, from such containers often damages the environment.

Due to these hazards, the Environmental Protection Agency (EPA), an agency of the U.S. Government, regulates disposal of pressurized containers as well as their contents for industries. These regulations mandate regulated businesses and industries dispose of pressurized containers as hazardous waste. The Resource Conservation and Recovery Act mandates that the pressure within aerosol cans equal atmosphere prior to disposal. Further, these regulations require that certain contents of pressurized containers be captured and disposed of in particular manners. Depending upon the natures of such contents, disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But, whichever disposal method is used, the EPA requires many industries to relieve the pressure in pressurized containers prior to transporting them for disposal.

In addition to the above requirements of the EPA, many states within the United States and countries outside the United States have requirements similar to, or even stricter than, those of the EPA. For example, California closely regulates release of gases into the atmosphere. In this respect, California considers some propellants used in aerosol cans to be contaminants, particularly when they contain small aerosolized particles of materials, such as insecticides, paints and the like, which were in the aerosol cans.

Further, while EPA regulations do not apply to individuals and many small businesses, many of these still desire to dispose of hazardous contents of such containers, and the containers themselves, in a manner which provides personal safety and protects the environment, and would do so if a reliable, inexpensive apparatus therefor exists.

There have been a number of prior-art devices suggested for piercing pressurized containers such as are described in U.S. Pat. No. 3,303,968 to Compere; U.S. Pat. No. 3,333,735 to Odasso; U.S. Pat. No. 3,828,976 to Sidelinker, U.S. Pat. No. 3,926,340 to Tygenhof; U.S. Pat. No. 4,500,015 to Penney, and U.S. Pat. No. 4,934,055 to Chambers. Some of these devices do not adequately provide for disposal of gases and residual contents of the pressurized containers, such as the devices of Compere, Sidelinker, Odasso, Tygenhof and Penney.

The device of Chambers (U.S. Pat. No. 4,934,055) does provide for disposal of contents of pressurized cans, however, this device appears to be somewhat limited in application having an unduly small, custom-built, reservoir and apparently requiring an undue amount of strength and dexterity to operate. Also, the device of this patent does not appear to be sufficiently durable to withstand repeated use.

A number of US patents to Michael Campbell describe systems for evacuating gaseous materials from aerosol containers and other types of containers, see U.S. Pat. Nos. 5,163,585; 5,265,762; and 5,992,475. Most of these systems involve sealing a wall of an aerosol can on a seat, puncturing the can below the seat, and evacuating the contents of the can into a drum.

A widely used device for piercing pressurized containers is described in U.S. Pat. No. 5,265,762 to Campbell et al. This Campbell et al. patent describes a puncturing device for aerosol containers which includes an elongated tubular housing having male threads at a second end for being screwed into a first, or large, bung-plug hole (bunghole) of an off-the-shelf drum, such as a 15, 30 or 55 gallon drum. An aerosol can to be disposed of is inserted into a first opening at a first end of the cylindrical housing, nozzle-end-first, until a shoulder of the aerosol can engages a sealing shoulder seat in the elongated tubular housing. A puncturing member, as part of a mechanism mounted to the side of the housing, is driven through the housing to create a puncture opening in the aerosol can below the sealing shoulder seat. Propelling gas and residue material are driven from the aerosol can, by pressure of the propellant gas, through the puncture opening and through the second end opening of the housing into the drum. The sealing shoulder seat prevents the propellant gas and residue from retro-movement toward the first end opening of the housing (which opens to the environment) and ensures that these materials go into the drum.

Campbell et al (U.S. Pat. No. 5,265,762) also describes a filter screwed into a second, small, bunghole of the drum for filtering propellant gases escaping from the second bunghole of the drum to the environment for cleaning escaping gaseous vapors of atmosphere-harmful materials.

U.S. Pat. No. 5,992,475 to Campbell discloses a spring-activated check valve at the second end of the tubular wall of the housing with a spring-activated valve poppet positioned at the second end for opening and closing in response to pressure. Basically this check valve opens to allow propellant gases to escape from the punctured aerosol cans into the drum and then closes to prevent retrograde movement of the gases from the drum back through the piercing-device housing once the cans are removed. U.S. Pat. No. 5,181,462 to Isaac also describes a similar valve.

Other patents which describe devices and systems relating to the system described in Campbell et al (U.S. Pat. No. 5,265,762) include U.S. Pat. No. 3,358,883 to Loe; U.S. Pat. No. 3,828,976 to Sidelinker, U.S. Pat. No. 3,926,340 to Tygenhof; U.S. Pat. No. 4,349,054 to Chipman et al; U.S. Pat. No. 5,114,043 to Collins, Jr.; U.S. Pat. No. 5,181,462 to Isaac; U.S. Pat. No. 5,271,437 to O'Brien et al; U.S. Pat. No.

5,284,997 to Spearman et al; U.S. Pat. No. 5,309,956 to Hajma; U.S. Pat. No. 5,365,982 to O'Neill; U.S. Pat. No. 6,422,273 to Campbell; and U.S. Pat. No. 6,644,515 to Campbell. Additional patent documents disclosing devices for puncturing pressurized cans and/or disposing of their contents include U.S. Pat. No. 5,067,529 to Gonzalez-Miller et al., U.S. Pat. No. 4,459,906 to Cound et al, and U.S. Pat. No. 4,407,341 to Feldt et al. as well as Soviet patent document 821399 and German Offenlegungsschrift 1,607,991. All of these patent documents disclose relatively complicated, expensive, and large machines.

Although these prior-art devices prevent retrograde movement of unfiltered gases through the piercing-device housing back to atmosphere, they do not filter gases as they pass through the filter from the small bunghole in a manner which indicates when the filter is saturated and which inhibits flashback. Flow of such gaseous materials through the filter to atmosphere can be dangerous because personnel standing near the drum containing evacuated residue and gases are not aware that dangerous gases are being continually released. For example, one might smoke a cigarette close to a storage drum, thereby possibly igniting gases escaping from the drum through the filter. For this reason, it is desirable that evacuation systems filter residue and/or contaminants from the gaseous materials that escape into the atmosphere and prevent flashback so that the fumes are not ignited.

It is an object of the invention to provide a filter assembly for use in conjunction with a storage drum into which the contents of pressurized cans have been emptied. In common use, the filter assembly is used in conjunction with a device for puncturing a pressurized container to relieve the pressure therein and for releasing gases and residual contents thereof into a storage drum.

It is further an object to provide a filter assembly which is not unduly complicated, which can be easily transported to a site and installed thereat, which is relatively easy and convenient to use requiring no outside power, which can be used with off-the-shelf receptacles in common use, which is relatively inexpensive to manufacture, which operates in a manner complying with EPA regulations in a safe and efficient manner, and which can accommodate pressurized containers of various sizes. Thus, it is an object of this invention to provide a device for allowing desired easy flow of evacuated gaseous materials through a filter of an evacuation system when the evacuation system is being actively use for evacuation, but for stopping such flow when gaseous materials are not being actively evacuated.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a device for filtering exhaust fumes from a storage container, having an upper filter chamber which has an outer housing and contains filter material, preferably activated carbon, such that exhaust fumes may pass therethrough and residue is filtered from the exhaust fumes. A lower filter chamber has an outer housing and contains a coalescing filter for filtering residue from the exhaust fumes. The upper end of the lower filter chamber is attached to a lower end of the upper filter chamber and the lower end of the lower filter chamber is adapted to attach to a venting hole on the storage container. A visual indicator is attached to the filter assembly which indicates when the filter assembly is saturated with residue and a flashback inhibitor, preferably a stainless steel screen, prevents flashback of the exhaust fumes or residue. The visual indicator is preferably a temperature indicator and/or an airflow indicator. A temperature indicator is attached to the inside or outside of the outer housing of the upper filter chamber. If the temperature indicator is attached to the inside of the outer housing of the upper filter chamber, then the outer housing includes a transparent window such that the temperature indicator may be seen through the outer housing. The temperature indicator provides a temperature reading of the temperature inside of the filter assembly or may indicate whether a sufficient temperature increase has been achieved inside of the filter assembly. An airflow indicator is a transparent chamber located between the upper filter chamber and the lower filter chamber which encloses a lightweight material which reacts to an airflow, preferably at least one spherical floating element. The flashback inhibitor is located either at the lower end of the upper filter chamber below the filter material or at the upper end of the lower filter chamber above the coalescing filter or, preferably at both locations. The upper filter chamber and lower filter chamber are preferably made from aircraft grade aluminum or polyethelene. In the preferred embodiment, the upper filter chamber and said lower filter chamber are connected by an airtight, threaded connection by means of an o-ring.

BRIEF DESCRIPTION OF THE DRAWINGS

A more complete description of the subject matter of the present invention and the advantages thereof, can be achieved by reference to the following detailed description by which reference is made to the accompanying drawings in which.

Figure 1:
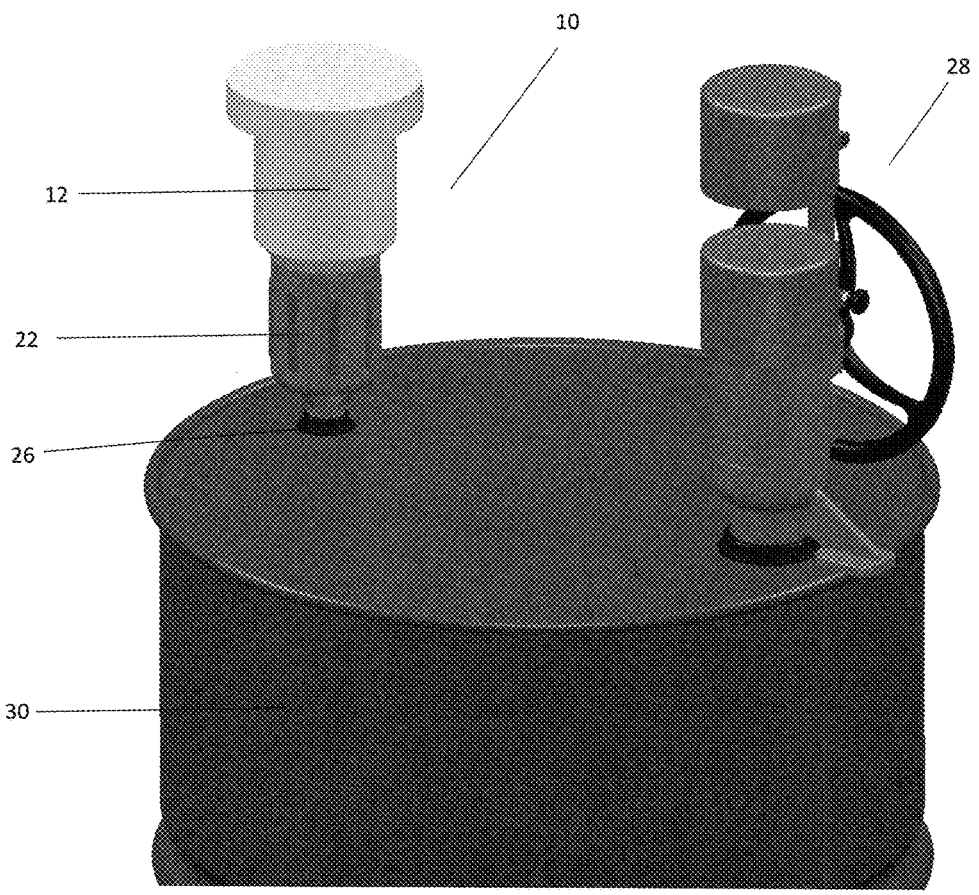
FIG. 1 is a perspective view of the invention in use with a storage drum and puncturing device.

ELEMENT LISTING 10 filter assembly
12 upper filter chamber
14 flashback inhibitor
16 o-ring
18 flashback inhibitor
20 coalescing filter
22 lower filter chamber
24 inlet port
26 outlet port
28 puncturing device
30 storage drum
32 activated carbon
34 temperature indicator
36 flow indicator
38 flow indicator material
40 direction of gas flow

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

A puncturing device 28 for evacuating pressurized cans, punctures a pressurized container (aerosol can) for relieving the pressure therein and for releasing into a storage drum 30 gases and residue contents. The puncturing device 28 generally comprises an elongated housing, a puncturing apparatus, a force applying apparatus, and an auxiliary support member. Exemplary puncturing devices are shown in U.S. Pat. No. 6,422,273; U.S. Pat. No. 5,163,585; U.S. Pat. No. 5,265,762; U.S. Pat. No. 5,992,475 and co-pending U.S. patent application Ser. No. 14/623,996, filed Feb. 17, 2015 for Puncturing Device for Aerosol Containers, all of which are incorporated herein by reference in their entirety.

The puncturing device 28 generally works as follows: The elongated housing defines an elongated cavity with openings at either end thereof. The elongated housing member has an intermediate aperture through which a puncture pin extends. The elongated housing further includes a threaded terminus for selectively engaging and disengaging a large female threaded bunghole of a standard storage drum 30. It should be noted that other containers besides drums could serve as receptacles in similar systems. Further, in other embodiments the threaded terminus can be sized and threaded to fit other collection receptacles. In this regard, standard off-the-shelf drums mentioned above usually have 2 inch filling or spout bungholes with standard threads as well as three quarter inch venting bungholes, also with standard threads. Generally, drums meeting standards of other countries also usually have large and small threaded bungholes.

The puncturing device 28 comprises structure for driving the pressurized container onto the puncture pin or the puncture pin into the pressurized container to be emptied. Pressure in the thusly punctured pressurized container forces gases and residue materials from the container through the puncturing device 28 and into the storage drum 30.

A filter assembly 10, which can be part of a kit including the puncturing device 28, is mounted in the venting bunghole or outlet port 26 of the receptacle, a storage drum 30, for filtering escaping propellant gases and collecting gaseous vapors thereof. Propellants and other gases escaping through the filter assembly 10 to atmosphere are thereby filtered and released, with gaseous vapors being coalesced, prior to the release.

The filter assembly 10 depicted in the drawings is sometimes referred to as a two-stage capsule filter, it comprising a lower filter chamber 22 with a male pipe-threaded section or inlet port 24 for engaging female threads of the venting bunghole, or outlet port 26. On top of the lower filter chamber 22 is a detachable upper filter chamber 12 that can be removably attached to the lower filter chamber 22. The description in U.S. Pat. No. 5,284,997 to Spearman et al. describes such a filter assembly and the teachings of that patent are incorporated herein by reference.

Figure 2:
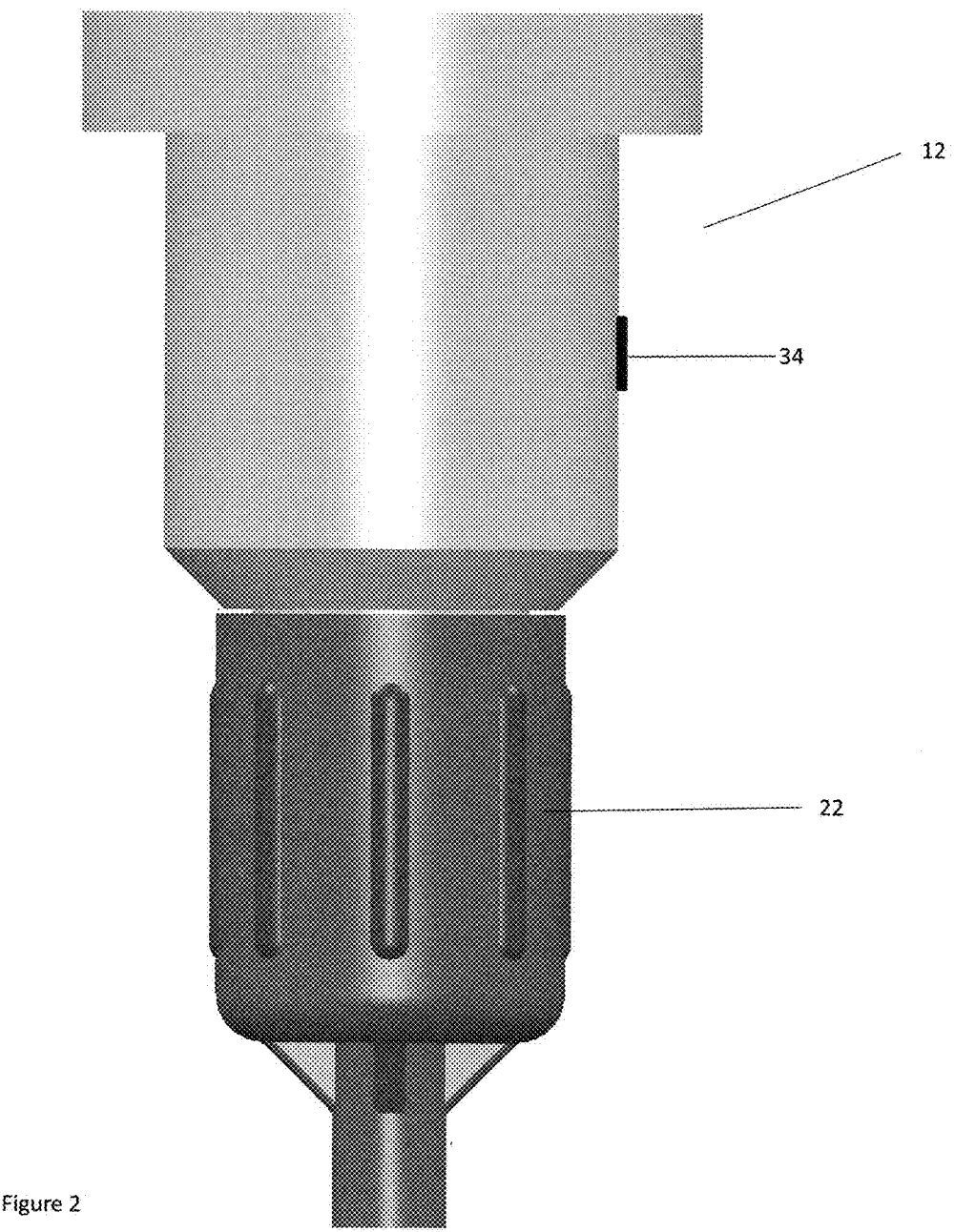
FIG. 2 is a side view of the first embodiment device of this invention.
Figure 3:
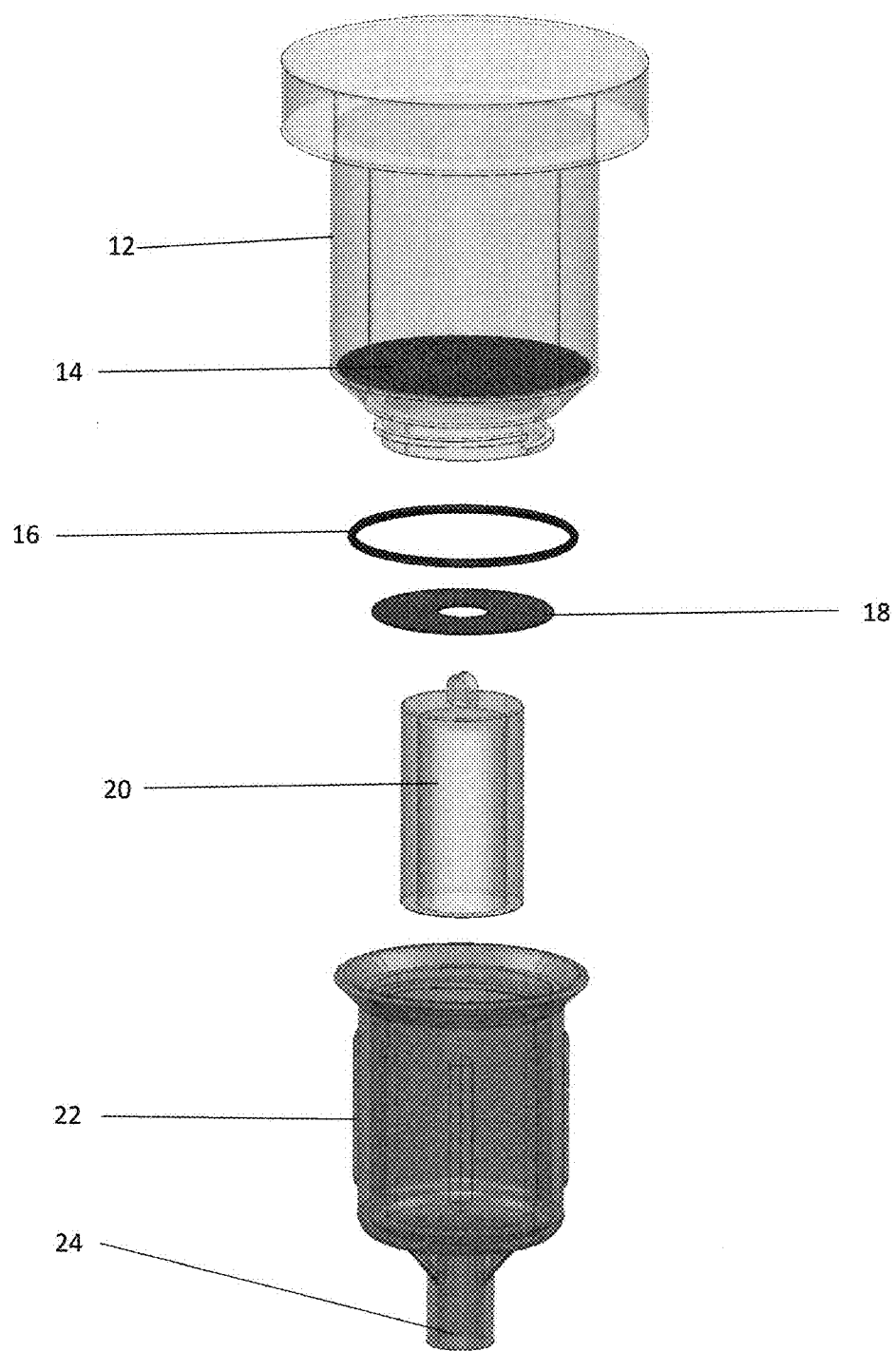
FIG. 3 is an exploded view of the first embodiment device of this invention.
Figure 4:
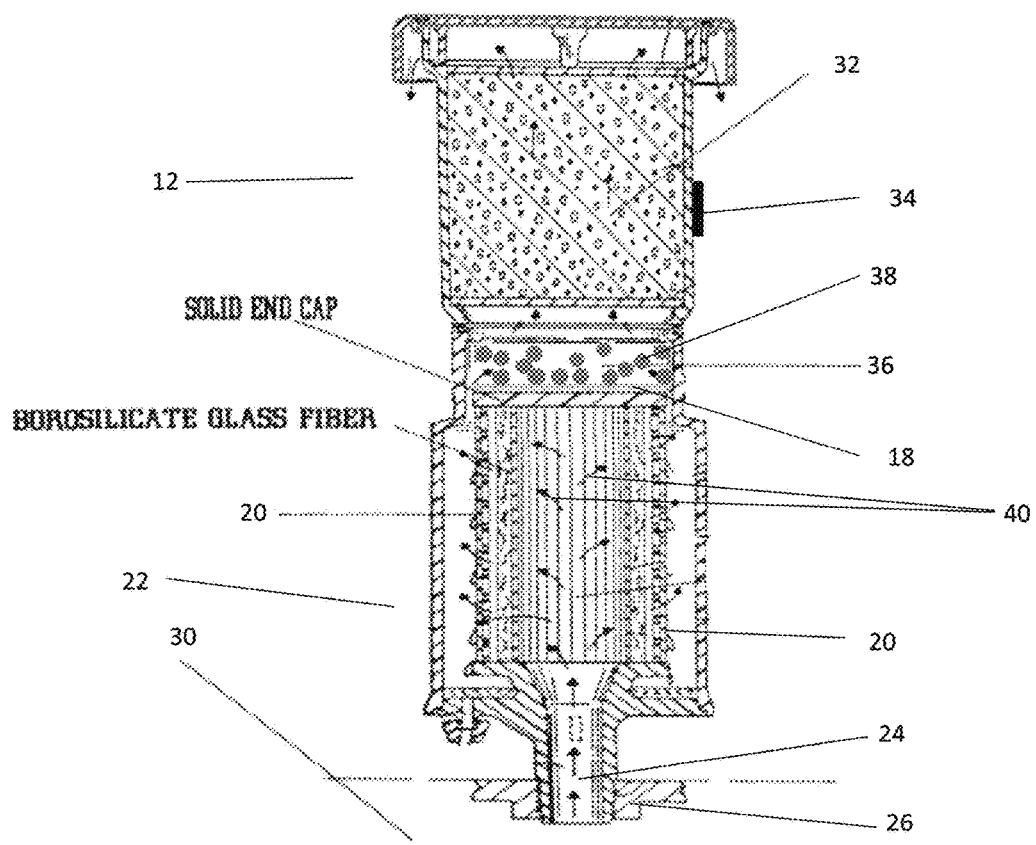
FIG. 4 is a cross sectional view of the second embodiment device of this invention.
Figure 5:
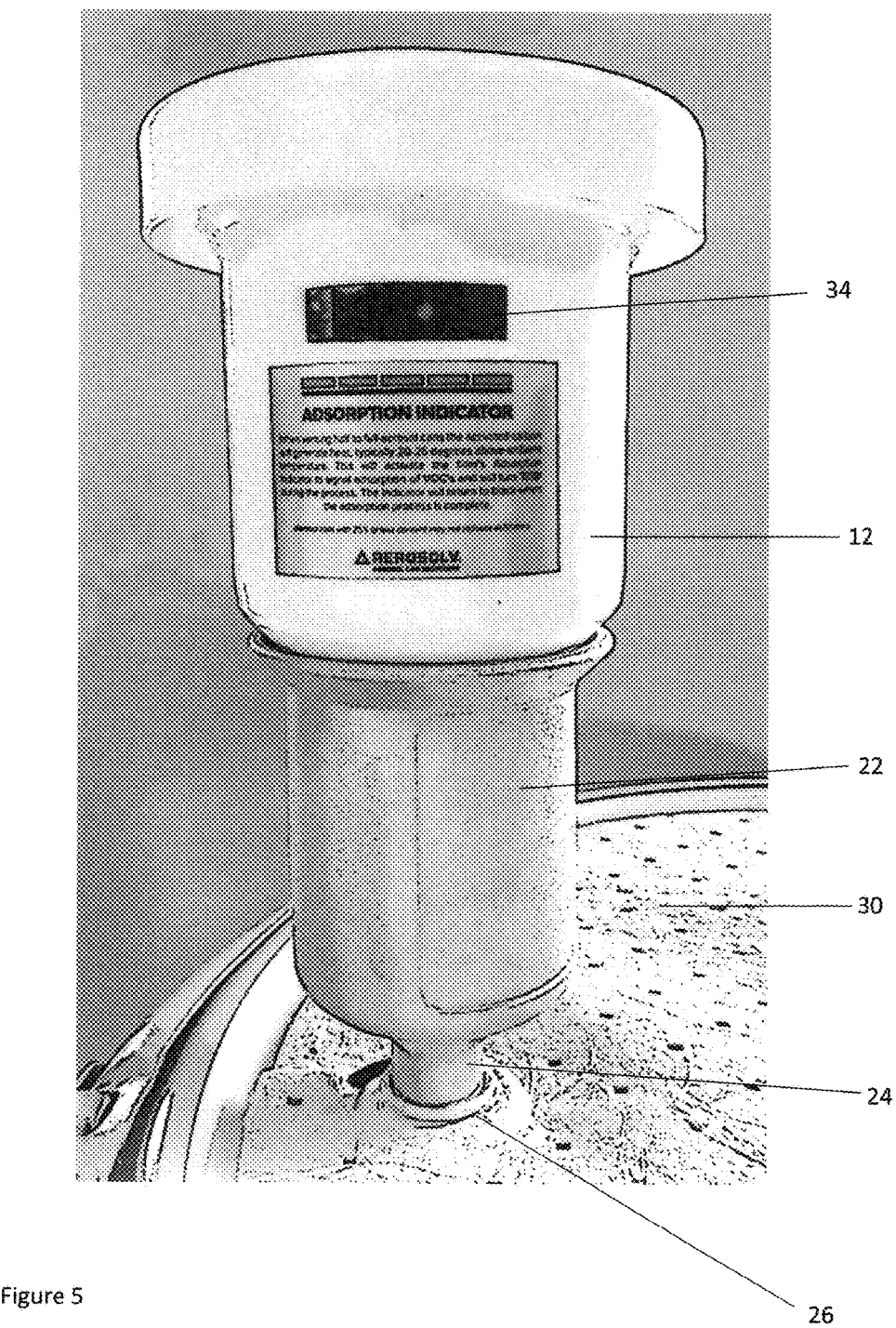
FIG. 5 is a perspective view of the invention.

Generally, as shown in FIGS. 1-5, the invention is an improved filter assembly 10 includes upper and lower filter chambers 12, 22, each of which has a housing, which is made from any material appropriate for this type of industrial device, preferably polyethylene or aircraft grade aluminum, with an inlet port 24 through which a propellant gas enters. The propellant gas then proceeds into a coalescing filter 20 which acts to remove up to 99.9% of the liquid particulate from the propellant gas. Once the propellant gas, now free from liquid particulates, exits the coalescing filter 20, it is preferably forced through a first flashback inhibitor 18. The flashback inhibitor 18 is preferably a stainless steel screen which is sufficiently porous to allow uninhibited flow of the propellant gas but prevents the flow of an indicator material into the lower filter chamber 22 of the filter assembly 10. The flashback inhibitor 18 additionally minimizes the ability of an ignited propellant to path or return to the storage drum 30 should the propellant gas accidentally become ignited by an outside source during the filtration process. The propellant gas then enters the upper filter chamber 12 which preferably contains activated carbon 32. In this chamber, activated carbon 32 adsorbs hydrocarbons from the propellant gas. A second flashback inhibitor 14, preferably a stainless steel screen, is preferably included within the upper filter chamber 12 to provide additional safety.

This filter assembly 10 includes a method for determining when it has ceased to function as intended and requires replacement. A visual indicator may be in the form of a temperature indicator 34 attached to the upper filter chamber 12 of the filter assembly 10. During proper functioning of the upper filter chamber 12, adsorption of hydrocarbons by the activated carbon 32 causes an increase in temperature of the housing around the upper filter chamber 12 of the filter assembly 10, preferably by having the temperature indicator 34 in direct contact with the upper filter chamber 12. A temperature indicator 34, preferably a liquid crystal indicator, is attached to the outer or inner surface of the outer housing of the upper filter chamber 12. If the temperature indicator 34 is attached to the inner surface of the outer housing, the housing includes a transparent window such that the indicator may be seen through the outer housing of the upper filter chamber 12. This temperature indicator 34 shows the appropriate temperature increase so long as the filter assembly 10 is functioning properly. Once the filter assembly 10 fails to function properly, either because the coalescing filter 20 is saturated or because the activated carbon 32 in the upper filter chamber 12 is incapable of adsorbing additional hydrocarbons from the propellant, the temperature indicator 34 displays a temperature below the normal functioning temperature. This temperature indicator 34 may display either the ambient temperature, in degrees, during operation or may simply indicate that the required temperature increase has been achieved.

Alternatively, a visual indicator in the nature of a flow indicator 36 can be located in the filter assembly 10, preferably, between the lower filter chamber 22 and the upper filter chamber 12, above the flashback inhibitor 18. This flow indicator 36 is preferably a translucent section in the housing into which at least one lightweight object is placed, preferably a plurality of lightweight beads, to act as flow indicator material 38. As the propellant gas flows 40 through the flashback inhibitor 18 and enters the translucent section of the flow indicator 36, the beads, acting as a flow indicator material 38, are agitated to indicate gas continues to flow. The translucent portion of the flow indicator 36 allows the operator to see the beads, acting as a flow indicator material 38, and appreciate when they are agitated or still. The coalescing filter 20 in this device eventually becomes saturated with liquid particulates as they are removed from the propellant gas. Once the coalescing filter 20 is saturated, flow of the propellant gas is impeded such that the beads, acting as a flow indicator material 38, are no longer agitated. Once this occurs, the filter assembly 10 must be replaced.

The propellant gas then enters the upper filter chamber 12 of the filter assembly 10. In this portion, activated carbon 32 adsorbs hydrocarbons from the propellant gas.

In construction, the coalescing filter 20 is inserted into the housing of the lower filter chamber 22 and rests upon a protrusion on the floor of the housing. The first flashback inhibitor 18 includes a central hole which fits over a protrusion on the top of the coalescing filter 20. The O-ring 16 rests on a lip located near the upper end of the housing of the lower filter chamber 22. The lower end of the upper filter chamber 12, which includes activated carbon 32, then screws onto threads in the upper end of the housing of the lower filter chamber 22 with a sealed connection via the O-ring 16. This design allows for replacement of the coalescing filter 20 and/or the activated carbon 32, as needed.

It can be appreciated by those of ordinary skill in the art that neither the filter assembly 10 of this invention does not require a power source and can be located indoors or outdoors with no consideration for access to electricity or other power sources.

Also, the filter assembly 10 of this invention can be directly attached to existing off-the-shelf collection containers or receptacles for collection of residual contents. That is, since the threaded terminus or inlet port 24 of the filter assembly 10 is sized to engage bung threads of typical storage drums, the invention can be easily transported without consideration for transporting large containers and can be inexpensively manufactured. It should be understood that although the device has been described herein to be mounted on drums standard in the United States, it could be sized to drum standards in any country.

This invention is portable, lightweight and inexpensive, all features which facilitate compliance with regulations within a manufacturing plant. That is, the invention can be located at each "work center" at the convenience of workers, rather than in one centralized location which is where a large expensive machine would typically be located. That is, if a facility employs expensive machines, it is not economical to have many such machines spread out through the facility. However, manufacturing facilities have, in addition to their normal production line, maintenance shops where many aerosol cans are used, such as pump shops, machine shops, electrical shops, HVAC shops, maintenance shops etc.

This invention facilitates the filtering of gases released from aerosol cans since filters can be relatively easily mounted to vent bung ports of standard drums.

Further, the filter assembly 10 of this invention can be easily disassembled for required maintenance such as replacing the coalescing filter 20 or the activated carbon 32.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. A filter assembly for filtering exhaust fumes from a storage container, said assembly comprising:
   an upper filter chamber having an outer housing and containing filter material configured to permit exhaust fumes to pass therethrough and to filter residue from the exhaust fumes;
   a lower filter chamber having an outer housing and containing a coalescing filter for filtering residue from the exhaust fumes, wherein an upper end of the lower filter chamber is attached to a lower end of the upper filter chamber and a lower end of the lower filter chamber is adapted to attach to a venting hole on the storage container;
   a visual indicator attached to the filter assembly, the visual indicator being adapted to provide an indication when the filter assembly is saturated with residue; and
   a flashback inhibitor for preventing flashback of the exhaust fumes or residue.

2. An assembly as in claim 1 wherein said filter material comprises activated carbon.

3. An assembly as in claim 1 wherein said visual indicator comprises a temperature indicator.

4. An assembly as in claim 3 wherein said temperature indicator is attached to the outer housing of the upper filter chamber.

5. An assembly as in claim 3 wherein said temperature indicator is attached to an inside of the outer housing of the upper filter chamber, and wherein the outer housing includes a transparent window, said temperature indicator being positioned with respect to said transparent window such that said temperature indicator is visible through said transparent window.

6. An assembly as in claim 3 wherein said temperature indicator is adapted to provide a temperature reading of a temperature inside of the filter assembly.

7. An assembly as in claim 3 wherein said temperature indicator is adapted to provide an indication of whether a predetermined temperature increase has been achieved inside of the filter assembly.

8. An assembly as in claim 1 wherein said visual indicator comprises an airflow indicator.

9. An assembly as in claim 8 wherein said airflow indicator is disposed within a transparent chamber located between the upper filter chamber and the lower filter chamber.

10. An assembly as in claim 9 wherein said airflow indicator comprises at least one lightweight object sized to move in response to a flow of gas moving past said airflow indicator, said at least one object being disposed within said transparent chamber encloses.

11. An assembly as in claim 10 wherein said at least one lightweight object comprises at least one spherical element.

12. An assembly as in claim 1 wherein said flashback inhibitor comprises a screen.

13. An assembly as in claim 1 wherein said flashback inhibitor is located at the lower end of the upper filter chamber below the filter material.

14. An assembly as in claim 1 wherein said flashback inhibitor is located at the upper end of the lower filter chamber above the coalescing filter.

15. An assembly as in claim 1 wherein said upper filter chamber and lower filter chamber are made from a material selected from the group consisting of aircraft grade aluminum and polyethylene.

16. An assembly as in claim 1 wherein said upper filter chamber and said lower filter chamber are connected by a threaded connection.

17. An assembly as in claim 1 wherein said upper filter chamber and said lower filter chamber are connected by an airtight connection.

18. An assembly as in claim 17 wherein said airtight connection comprises an o-ring.

* * * * *